(12) United States Patent
Brusletto

(10) Patent No.: US 11,597,888 B2
(45) Date of Patent: Mar. 7, 2023

(54) METHOD AND APPARATUS FOR PRODUCTION OF CELLULOSE BASED FUEL PELLETS

(71) Applicant: Arbaflame Technology AS, Matrand (NO)

(72) Inventor: Rune Brusletto, Jar (NO)

(73) Assignee: Arbaflame Technology AS, Matrand (NO)

( * ) Notice: Subject to any disclaimer, the term of this patent is extended or adjusted under 35 U.S.C. 154(b) by 0 days.

(21) Appl. No.: 16/639,705

(22) PCT Filed: Aug. 15, 2018

(86) PCT No.: PCT/NO2018/050211
§ 371 (c)(1),
(2) Date: Feb. 17, 2020

(87) PCT Pub. No.: WO2019/035723
PCT Pub. Date: Feb. 21, 2019

(65) Prior Publication Data
US 2021/0130721 A1 May 6, 2021

(30) Foreign Application Priority Data
Aug. 16, 2017 (NO) .................................. 20171359

(51) Int. Cl.
*C10L 5/44* (2006.01)
*C10L 5/14* (2006.01)
(Continued)

(52) U.S. Cl.
CPC ............... *C10L 5/442* (2013.01); *C10L 5/143* (2013.01); *C10L 5/363* (2013.01); *C10L 9/08* (2013.01);
(Continued)

(58) Field of Classification Search
CPC .......... C10L 5/442; C10L 5/143; C10L 5/363; C10L 9/08; C10L 2290/28; C10L 2290/546
See application file for complete search history.

(56) References Cited

U.S. PATENT DOCUMENTS 6,152,973 A * 11/2000 Romell .................... B27M 1/02
44/590
2009/0223119 A1 9/2009 Brusletto et al.
(Continued)

FOREIGN PATENT DOCUMENTS

DE 202014007067 U1 9/2014
EP 2239114 B1 8/2015
WO 2006050259 A1 5/2006

OTHER PUBLICATIONS

International Search Report and Written Opinion dated Nov. 14, 2018 (PCT/NO2018/050211).

*Primary Examiner* — Cephia D Toomer
(74) *Attorney, Agent, or Firm* — Alix, Yale & Ristas, LLP

(57) ABSTRACT

A method and apparatus for production of cellulose based fuel pellets from wood logs includes steps of comminuting the wood logs to particulate wood material. The particulate material heat treated in a reactor and the pressure is reduced in a manner causing defibration of the particulate material. The material is pelletized using the softened lignin at least partially as a binder for the pellets. The comminution of the wood logs is effected as a single-step operation in which the wood logs are charged to a comminution station where at least one rotating drum provided with cutting teeth is arranged in a manner to fully comminute the wood logs. The particulate material may be fractioned and a selected size fraction used for the further treatment.

13 Claims, 3 Drawing Sheets

(51) Int. Cl.
*C10L 5/36* (2006.01)
*C10L 9/08* (2006.01)

(52) U.S. Cl.
CPC ..... *C10L 2290/28* (2013.01); *C10L 2290/546* (2013.01)

(56) References Cited

U.S. PATENT DOCUMENTS

2013/0008987 A1   1/2013  Peterson et al.
2016/0002554 A1*  1/2016  Tumuluru ............... C10L 5/445
                                                         44/589

* cited by examiner

METHOD AND APPARATUS FOR PRODUCTION OF CELLULOSE BASED FUEL PELLETS

BACKGROUND

The disclosure relates to production of fuel pellets and a related apparatus for production of cellulose based fuel pellets.

Cellulose based fuel pellets have been known for some decades. Due to an increasing focus on sustainability in energy production, use of cellulose based pellets has been suggested and attempted in industrial combustion plants mainly designed for coal. For a little more than a decade, various attempts have been made to increase the energy content in such cellulose based fuel pellets to make them more competitive compared with coal and thus more suitable for use in a combination with coal or as an alternative to coal in industrial combustion plants for production of electricity.

Some alternative processes have been developed to produce energy enhanced cellulose based fuel pellets, also called black pellets, where cellulose containing materials, mostly wood and waste from wood industry, have been comminuted, subjected to heat treatment and pelletized with a controlled low moist content. One highly interesting process for such heat treatment is referred to as steam explosion.

An area which has received somewhat less interest, but is also of importance in relation to cellulose based pellets productions and in particular high energy black pellets, is the process of comminuting the cellulose material. It is of importance that the comminution is conducted in an energy efficient manner, in a time-efficient manner, with a controlled particle size and preferably in a manner reducing the need for large storage volumes still maintaining the ability of continuous production.

In previous processes, there has been little control of the particle size and in particular the particle size distribution of the cellulose containing material charged to the steam explosion process or other adequate process for the heat treatment preceding the palletisation. This is due to a number of factors, partly that cellulosic materials of different origin and different physical properties have been mixed prior to the heat treatment, various types of equipment being used for the comminution of the different kinds of materials, partly that little emphasize has been directed to this part of the process.

When there is a high degree of variation in the particle size, it is hard to know how severe the heat treatment should be in order to obtain the desired property in the material. Moderate conditions applied to large particles may lead to insufficient softening of the lignin material while more severe conditions applied to small particles may lead to undesired decomposition of the material, undesired high energy consumption and release of toxic gases or gases with unpleasant odours.

A method for production of fuel pellets from biological materials such as sawdust, wood or similar, using steam explosion technique, is described by WO 2006/006863. The manner in which the sawdust or the like is produced is not commented or discussed in any detail in this publication.

The standard process for producing particles suitable of being pelletized from wood logs is a two step downsizing comprising:

log chipping by mean of a disk or a drum chipper, obtaining chips having a typical size of 20-50 mm×20-50 mm×3-15 mm chips milling by mean of hammer mills or knife ring mills, obtaining typical particle size of 5-50 mm×0.2-5 mm×0.2-5 mm.

Processes for wood chopping are known e.g. from U.S. Pat. Nos. 1,942,675, 3,061,207, 4,317,544, and 2,299,248.

SUMMARY

Provided herein is a method for producing wood based fuel pellets and in particular black pellets from wood logs in an efficient manner, technically and economically.

Embodiments may allow improved control of the particle size and particle size distribution of the cellulose raw material.

Also provided is a method and an apparatus that allow direct use of entire wood logs for the production.

Also provided is a method and an apparatus that allows production of high energy black pellets using heat treatment and subsequent defibration of the wood material.

The disclosed method and apparatus obtain enhanced efficiency with regard to the space required for the production plant.

Additionally, the disclosed method as indicated above is environmentally friendly.

The advantages of 1-step downsizing are lower energy consumption, lower footprint, more homogeneous PSD for the steam explosion but also better particle shape, more suitable to be milled in the typical ball mills used for coal.

Disclosed herein is a method for producing wood based fuel pellets and more specifically high energy black pellets from entire wood logs in which whole wood logs are comminuted on site in a single unity operation with comparatively low energy costs, low emissions of dust, strict control of particle size and a reduction in storage volumes and transportation costs.

In the disclosed embodiments, wood logs are comminuted at the site of the pelletizing production plant, and at a rate corresponding to the rate of the pellet production, thus eliminating the need for large storage rooms for particulate cellulose based material.

The comminution is also conducted in a manner ensuring a control of the particle size distribution of the material, thus allowing the conditions in terms of temperature, pressure and duration of the heat treatment to be optimized for the particles charged to the process.

The comminution is also conducted in a manner reducing the release of generated dust to the environment to a minimum.

Finally, the comminution is conducted in a highly energy-efficient and time-efficient manner.

The method disclosed herein is one in which a comminution station is an integral part of a pelletizing plant, allowing the particulate cellulosic raw material to be produced just at the time when its needed, with a desired and homogenous particle size, in an efficient manner, rendering large volumes of storage space superfluous.

With a narrow raw material particle size distribution, the heat treatment in terms of temperature, moisture and residence time can be optimized for that particle size and energy can be saved without jeopardizing the properties of the end product and without overheating parts of the raw material, causing material loss and generation of unpleasant or toxic gases. The heat treatment is typically conducted using pressurized steam.

With largest particle dimension is understood the largest linear <<length>> of the particle. Deviations may and will occur, but for a given dimension criterion to be fulfilled, at least 95% by number of the particles should satisfy the criterion.

The cutting drums of the disclosed embodiments contemplate integral cylindrical drums with cutting teeth, typically replaceable teeth, said cylindrical drum optionally having a unitary, undividable structure with the exception of its teeth.

An alternative configuration is cutting drums that are assembled from a number of individual saw blades, as a stack, each blade typically having a central area of lateral protrusions and recesses that are arranged to fit with the neighbouring saw blade in such a manner that they are interlocked and that neighbouring teeth between two adjacent blades are slightly offset from one another. In practice, this means that teeth on adjacent blades will not be aligned with one another. Thus, a (any) tooth on blade n and the nearest tooth on blade n+1, will not hit the log at exactly the same time and will therefore not act as one tooth with double width. When the cutting drum is assembled from individual saw blades, naturally this allows separate replacement of each individual blade.

Typically, the particulate raw material from the cutting station, although varying, has a largest linear dimension of 10 mm, more preferred 5 mm and for some embodiments more preferred about 3 mm. In order to obtain this, the cutting teeth have a largest linear dimension corresponding to the largest linear dimension of the particulate material.

The diameter of the cutting drum can vary within wide limits. If a cutting station has just one drum, its diameter should be at least about twice the diameter of the largest log to be charged to that station. Producing cutting drums of large diameters are, however, quite expensive, and it is more economical to arrange two cutting drums of more or less standard diameter than to produce one having double diameter. A typical cutting drum has a diameter in the range 250 to 500 mm.

The rotational speed of the drum is also a factor of interest, or more particularly the surface velocity of the drum in relation to the charge velocity of the log to be comminuted.

The rotational speed of the cutting drum is an important parameter in obtaining the desired result in terms of a given particle size, and in particular the ratio between the surface velocity of the drum and the linear forward velocity of the log being comminuted by the drum. If the linear forward motion of the log is 1 m/s, each part of the log needs to be cut at least 200 times in order to have a length not exceeding 5 mm. When the distance between teeth along a circumferential line is known, the drum surface velocity may be calculated. If the linear distance is 2.5 cm, the surface velocity needs to be at least 200×2.5 cm=500 cm/s. If the drum diameter is 50 cm, the circumference is 157 cm, and the required rotation speed becomes 60 times 500/157=191 rpm. Increased speed naturally provides smaller particles. Use of a drum with smaller diameter requires a higher speed for obtaining particles of same size. A person skilled in the art can easily calculate required rotational speed for a given particle size, when the other parameters are set.

The most effective cutting technique in modern sawmills produces sawdust with little energy. By focusing on the sawdust and more precise the particles where approximately 90% with the maximum length less than 5 millimeter one ca see that these fractions are produced with very little energy Typical data from a sawmill with circular saw are Saw blade—width=2.0 mm.

Motor=32 hp=24 kW

Feeding speed=100 m/min (6 km/h)

Cutting height=150 millimeter

Cutted volume=0.002 m*0.15 m*100 m/min*60 min/h=1.8 m³/h

Energy consumption)=24 kW/1.8 m³/h=13.2 kWh/m³ or 25-28 kWh/ton dry wood (based on wood with approx. 430 kg dry wood per m³).

Finnish sawmills uses following formula to calculate energy consumption by sawing;

$$P(W)=50\times(\text{Volume flow}) \text{ cm}^3/\text{s}.$$

Volume flow=feeding speed (cm/s)×cutting height (cm)×width of cut (blade) (cm)

This confirms energy consumption of 13.9 Kwh/m³ solid wood or approx. 25 KWh/dry ton wood, which becomes sawdust, which is the fraction this patent is aiming at.

BRIEF DESCRIPTION OF THE DRAWINGS

Below the invention is described in further detail in the form of exemplifying embodiments illustrated by the enclosed drawings, in which.

DETAILED DESCRIPTION

Figure 1:
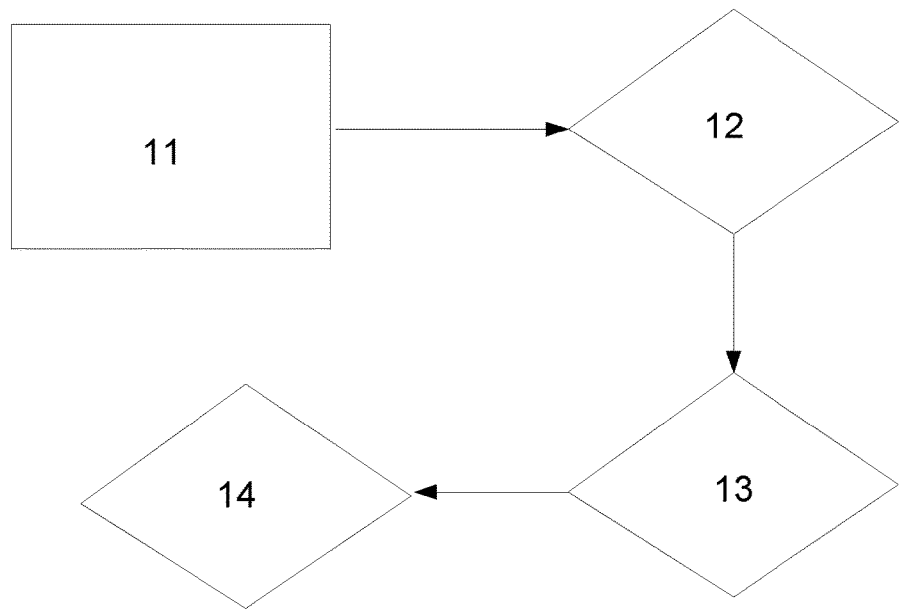
FIG. 1 is a flow sheet of a process in which the disclosed embodiments can be applied.

FIG. 1 is a simple flow chart of a process of producing black pellets from wood logs. From a store 11, wood logs are charged to a comminution station 12 where the logs are comminuted to particles of desired size in a single-step operation. The particles, sometimes also referred to as sawdust, are charged to a reactor system 13 for thermal treatment of the particles under pressure and subsequent pressure release. The flow chart is simplified in that the reactor system typically comprises a number of steps, typically drying, heating under pressure, (sudden) pressure release and eruption of material into a different reactor, subsequent further drying, involving movement of the material between different driers and reactors. Finally, the resulting fibrous material is pelletized in a pelletizer 14.

While all these steps are of interest in the overall process, an important focus and concern of the present method is the step of comminuting the timber logs to particulate matter in a manner more efficient than previously described, i.e. step 12 of FIG. 1. The timber logs may be charged to comminution undivided or after having been sectioned to large sections, e.g. sections of 2-5 meters.

Figure 2:
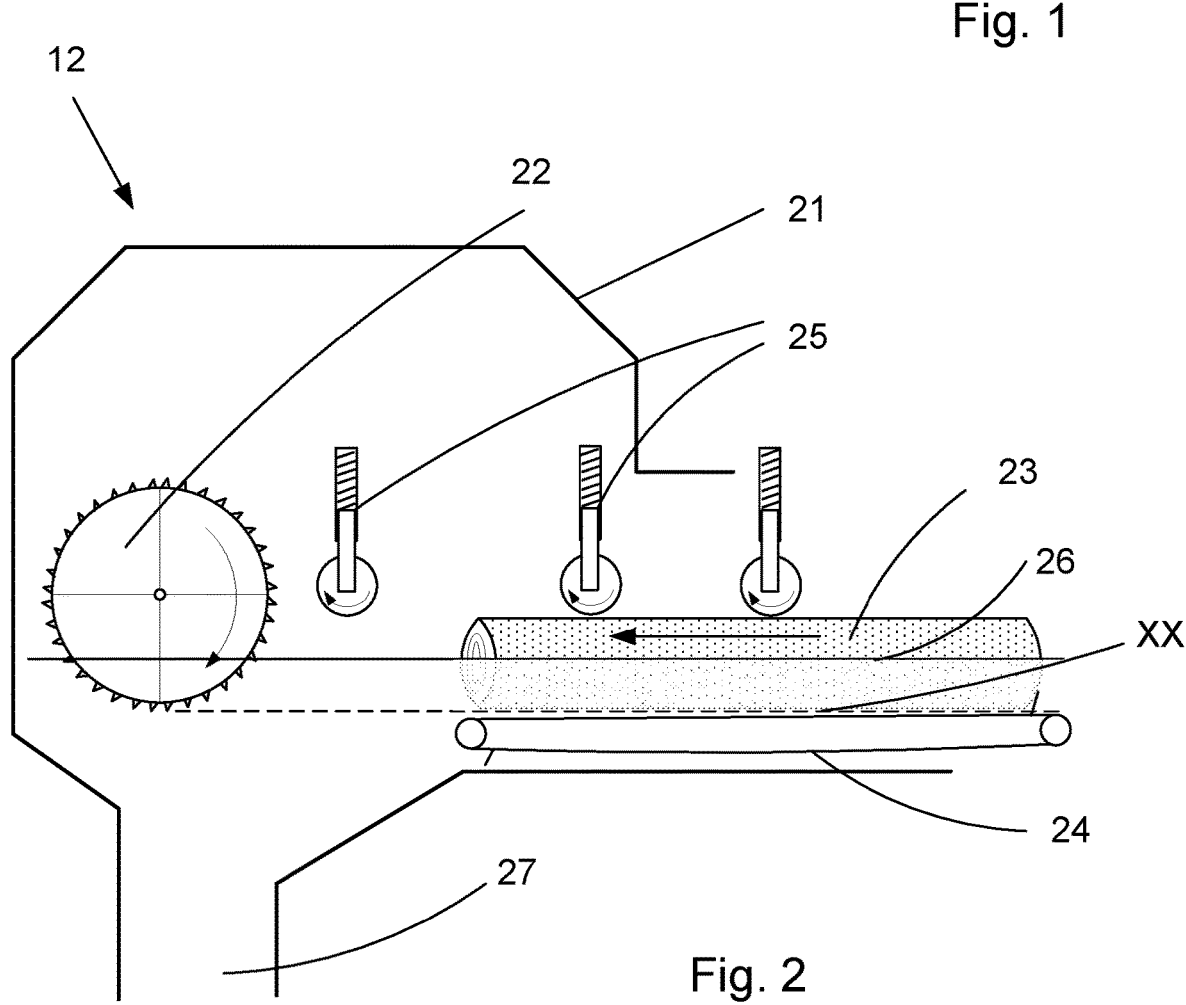
FIG. 2 is a schematic, simplified side view of a core element of a disclosed embodiment.

FIG. 2 shows in a simplified manner a comminution station 12 with a housing 21 in which the main tool is a cutting drum 22 provided with a number of cutting teeth along its width and circumference. A log 23 is shown being charged into the comminution station from the right towards the left in a linear manner. Different mechanisms may be applied for charge of the log; in FIG. 2 a conveyor belt 24 underneath the log is indicated to contribute thereto. A number of rotatable supporting wheels or drums 25, spaced apart linearly along the path of the log charge, are arranged to support the logs from above, which is particularly important once the cutting drum starts cutting the log. The supporting wheels are typically movable up and down to account for different log diameters and are also typically provided with spring elements to allow compensation for diameter variations along the length of each individual log.

The general floor level is indicated with a line 26, while the floor may exhibit a linear groove with a lowest level indicated by the broken line 27, along which the logs are charged. The groove provides stability sideways. Sideways stability may also be provided by particularly designed conveyor belts having members to support the logs sideways as well as members to force the logs forward in the direction of the drum.

The particulate material leaving the comminution station can leave through a vertical chute 27 in order to be gravity assisted. It is preferred, in addition, to use a fan or the like to assist the movement and to ensure that the pressure in the comminution station is reduced somewhat in comparison with the ambient pressure, in order to prevent dust from escaping the station, or at least to reduce the dust release therefrom.

Figure 3:
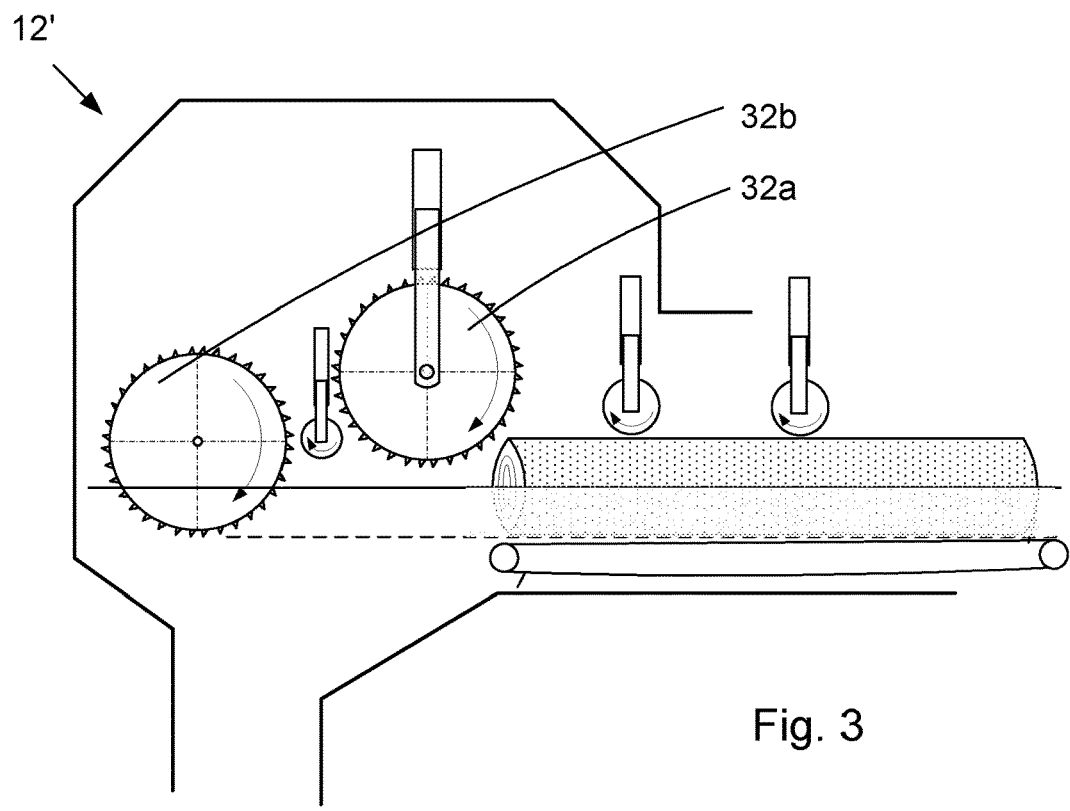
FIG. 3 is a schematic, simplified side view of a core element of another embodiment.

FIG. 3 shows a comminution station 12' generally similar to the comminution station 12 shown in FIG. 2 in which two cutting drums 32a, 32b are arranged in order to handle wood logs of large diameter without having to use a cutting drum of extreme size. In all other respects, the station 12' is similar to station 12. In addition, the embodiment of FIG. 3 is an example of comminuting the log in one single step or one single unit operation, since it all takes place during a simple linear movement of the log.

Figure 4:
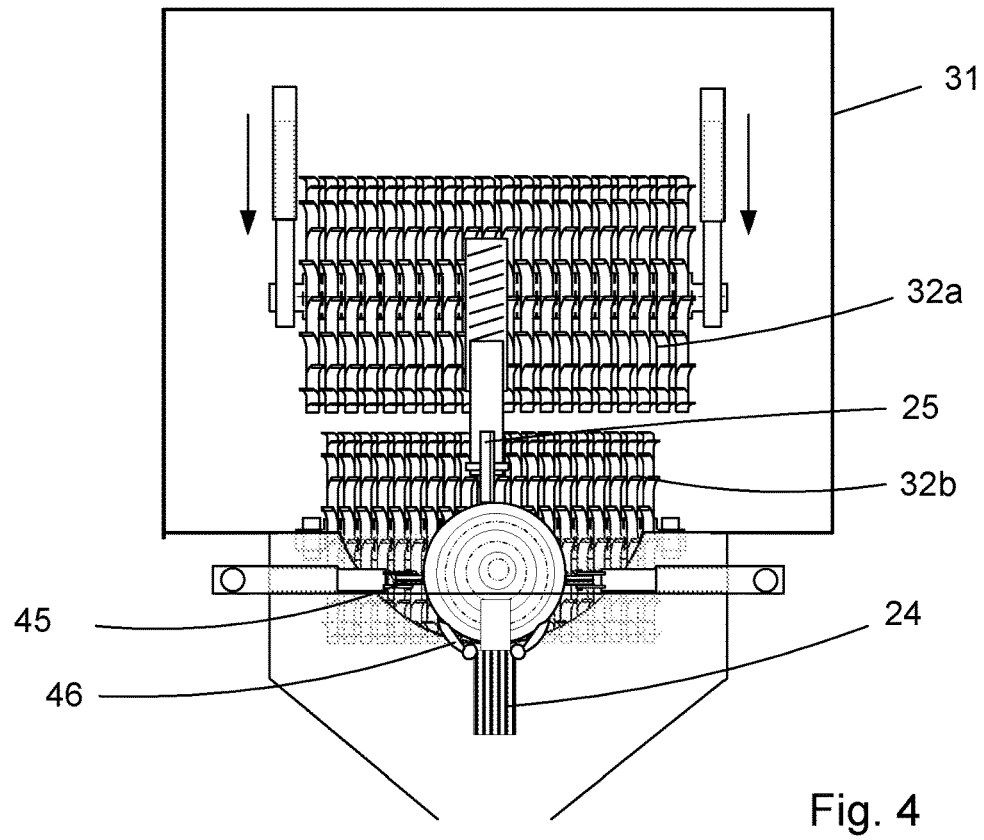
FIG. 4 is a schematic simplified front view of the embodiment shown in FIG. 3.

FIG. 4 is a front view of a comminution station generally similar to station 12' in that it comprises two cutting drums. In addition to a supporting wheel or drum 25, FIG. 4 also shows supporting wheels 45 laterally at each side of the log. As an even further measure to hold and stabilize the log, the conveyor belt is shown as provided with claws 46 evenly distributed along the belt, to support the logs against lateral movement.

FIG. 4 shows the "full package" of log stabilizing means. Perhaps needless to say, the conveyor system for the logs does not have to have all these stabilizing measures, but should include stabilizing measures vertically as well as horizontally.

In FIG. 4, the front cutting drum 32a is shown in an elevated position so as to make it better distinguishable from cutting drum 32b. In practice, the cutting drums would more typically largely "overlap" one another in the vertical direction as better illustrated in FIG. 3, not leaving to cutting drum 32b to cut the entire log.

Figure 5:
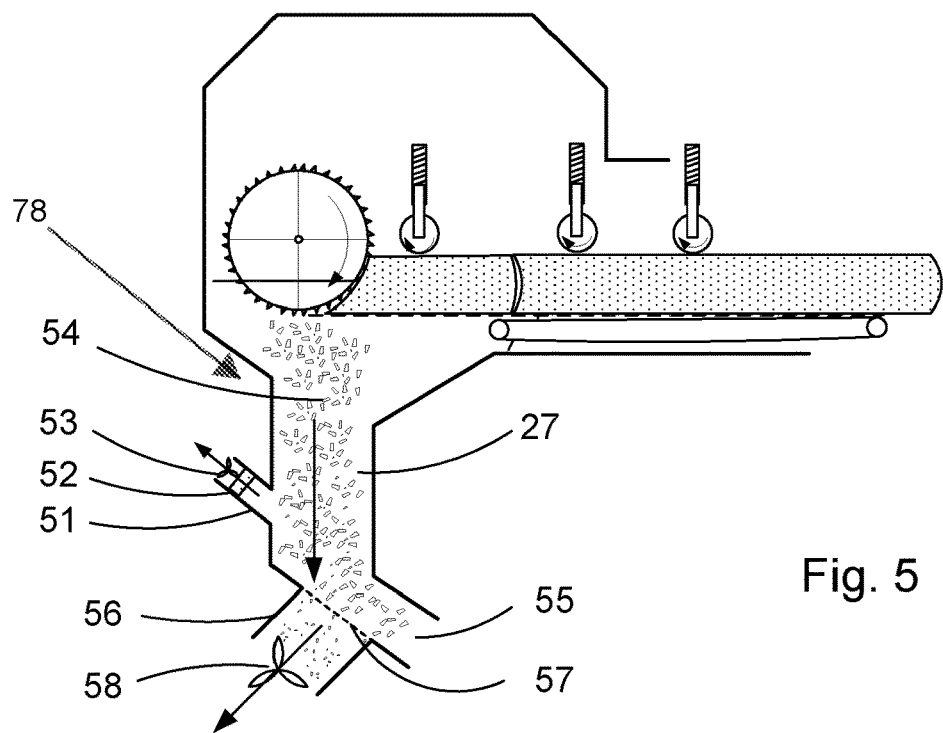
FIG. 5 is a schematic simplified side view of the embodiment of FIG. 2, showing additional elements.

FIG. 5 shows generally the same as FIG. 2, but in a situation in which logs are actually cut into particulate matter. A second log has moved tightly up behind the first one.

In the chute 27 through which the wood particles from the log falls towards the next process step, an upwards inclined pipe 51 with a fan 53 and a dust filter 52 is arranged. The fan 53 pumps air out from the chute 27 and from the cutting station above, placing the cutting station under a pressure slightly below ambient pressure to thereby reduce dust emission from the cutting station. The power of the fan is tuned to a level at which the typical particles from the cutting fall past the pipe 51 and further down the chute, while the finest of particles and dust will be collected by the dust filter 52. The pipe 51 can also be extended and curved to a vertical direction in order to move the fan 53 and the filter 52 further away from the chute 27 with the passing particles 54.

FIG. 5 also shows another and optional feature, a fractionating section 78. The fractionating section 78 includes a chute 27 may be split into two different pipes 55 and 56 with a sieve 57 arranged so as to only allow fine particles to pass into pipe 56 while coarser particles pass into pipe 55. A fan 58 can be arranged in pipe 58 to ensure that most of the particles small enough to pass through the sieve 57 actually do enter pipe 58. In this or a similar manner it is ensured that the particles in pipe 55, which in weight will be the majority of the particulate matter, is within a desired particle range. The fine particle fraction collected from pipe 56 may be subjected to similar or different treatment than the coarse fraction from pipe 55. If used to produce pellets, the heat treatment for the fine particle fraction will typically be conducted using more lenient conditions than what is the case for the coarse fraction. It should be emphasized that FIG. 5 only provides a simplified illustration of the particle fractioning which may be performed with any particle fractioning technology known and available. The desired size range is between 2 mm and 10 mm, more preferred between 2 mm and 5 mm.

Figure 6:
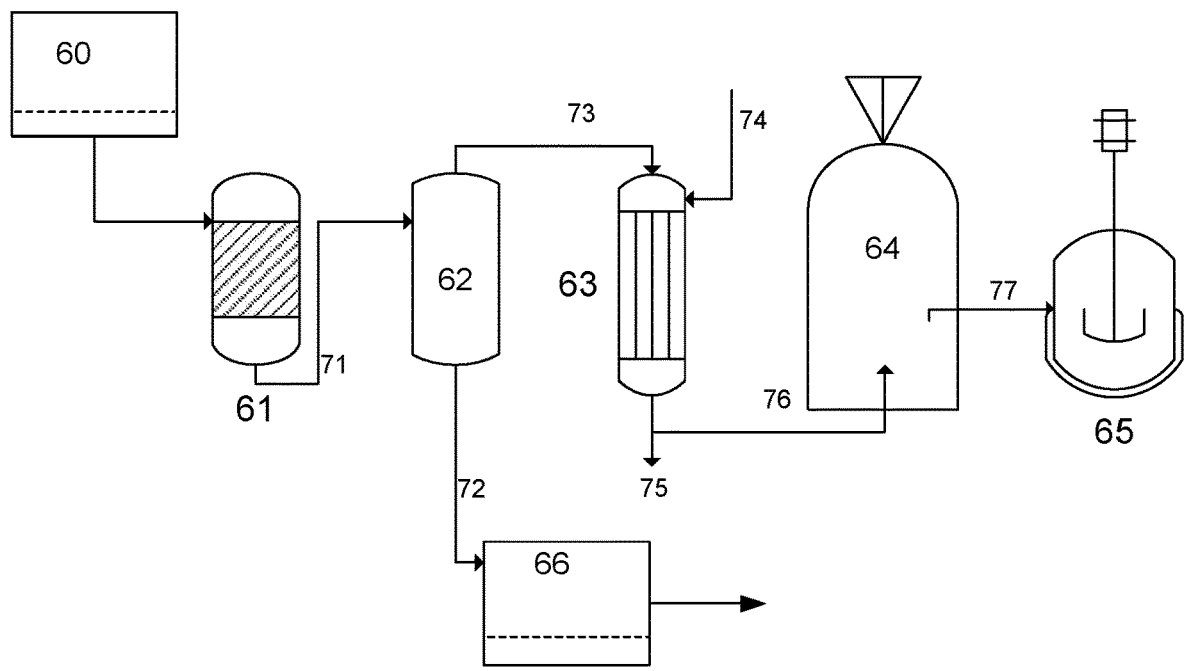
FIG. 6 is a flow chart of a preferred embodiment of step 13 from FIG. 1.

FIG. 6 is a flow chart that shows a preferred embodiment of step 13 of FIG. 1.

FIG. 6 shows to the upper left a vessel 60 for drying the particulate material to desired level of moisture, e.g. in the range 20-50 or 30-40% by weight moisture. Next, a reactor 61 for heat treatment of the particulate wood material is shown. In the reactor 61 the particulate wood material is heated under pressure in the presence of water vapor and air. The mixing ratio between water vapor and air may vary and the filling level of the reactor can likewise vary.

Temperature and residence time in the reactor may vary and are typically in the range from 180 to 250° C. and from 1 to 15 minutes. Higher temperatures and longer processing time are usually undesirable because they would lead to greater degradation, more mass loss and problems in operating the downstream process in the form of undesirable amounts of non-condensable gases, gases with strong odours, etc.

The reactor 61 typically comprises equipment and devices for controlling and monitoring the process, including valves to control pressure, means for heating and cooling of the reactor respectively, etc. This is not illustrated. The treatment in reactor 61 leads a.o. to softening of the lignin in the wood, making it useful as a binder in the subsequent pelletization.

Vessel 62 is a pressure release vessel into which the reaction mixture is released at end of treatment in reactor 61. At least a portion of the pressure in the reactor 61 is released abruptly, thereby expelling the reaction mixture from the reactor into the pressure release vessel 62.

The skilled artisan will appreciate that gases other than steam and air may be present in the reactor, provided that they do not interfere negatively with the process quantities. For example, the ratio between oxygen and nitrogen in the reactor be different from what is the case in air, e.g. through the addition of oxygen enriched air or oxygen consumed during the process.

On completion of reaction treatment the reaction mixture is expelled from the reactor 61 to pressure release vessel 62 via conduit 71. This is performed in a manner well known in the art. The solid particulate material with a certain quantity of moisture is moved into the pressure release tank 62 and transferred via conduit 72 to the step of pelletization, typically after a step 66 of after-drying.

The gas containing condensable components as well as components which are not condensable within the prevailing conditions, passes through conduit 73 at or near the top of the pressure release vessel 62 and is led therefrom directly to at least a heat exchanger 63.

The heat exchanger 63 cools the gas flow and ensures that the condensable components of the gas are condensed, so as to thereby reduce the volume of the gas flow. The heat of condensation received by the refrigerant is utilized as energy in any suitable manner within or outside the current process. Typically, this energy is used to preheat the air for a drying unit or for combustion. The condensate from the heat exchanger 63 contains, in addition to water, components that should be removed before the water is discharged or recycled for reuse. The condensate is discharged through conduit 75, while the gas passes to the next step in the process through conduit 76.

As regards the heat exchanger or heat exchangers 63 this or these can be indirect heat exchangers where the refrigerant is kept separate from the vent gases or it can be direct heat exchangers where cooling water is mixed with the vent gases. A combination of direct and indirect heat exchange is also an option, in which the heat exchange mainly is indirect, but where water 74 at a limited rate is sprayed into the flow of discharge gases into the heat exchanger 63 to cause a quenching of the discharge gases in conduit 73 to thereby more easily condense all condensable components in the subsequent indirect step of heat exchange.

If one chooses to use only direct heat exchange, a much larger volume of fluid needs to be handled downstream of the heat exchanger. It is therefore preferred that the heat exchange at least partially is conducted as indirect heat exchange.

The next step of the process consists of a container 64 with flexible volume, typically a "balloon", which like other balloons has soft walls and is dimensioned so that it is able to receive the "puff" of non-condensable gases resulting from expulsion from a batch reactor operated under normal operating conditions.

The gases leaving container 64 through conduit 77 may be subjected to after-treatment in a final step, e.g. a burner 65 to burn off combustible gases before releasing non-toxic components.

It should be noted that the detailed steps according to FIG. 6 are not novel as such, but represent a favourable method for the step 13 of FIG. 1 since they combine sound economy with sound environment.

It is furthermore to be noted that the step of defibration may also be obtain using a continuous and slower pressure reduction as an alternative to the steam explosion technique. Such continuous pressure reduction may be obtained using a screw conveyor to continuously and comparatively slowly discharging the heated material from the reactor. In some contexts, the continuous process may be preferred over the steam explosion.

The final step 14 of FIG. 1, the pelletization, may be conducted in any manner known in the field, their common denominator being application of pressure and use of the heated lignin in the wood as a binder, resulting in pellets with a low, controlled level of moisture, excellent mechanical properties and a high energy content.

The inventive embodiments provide a condensed process requiring comparatively small footprint in that storage of raw material is reduced to storage of compact wood-logs, good control of the particle size and a narrow particle size distribution which in turn allows the The advantages of the disclosed embodiments are the lower energy consumption, lower footprint, more homogeneous particle size distribution but also better particle shape in terms of shorter fibres, more suitable to be milled in the typical mills used for coal, biomass etc.

The invention claimed is:

1. An apparatus for production of cellulose based fuel pellets from elongate pieces of wood material comprising:
   a. a comminution station configured to comminute elongate pieces of wood into smaller particulate wood material,
   b. a process plant configured to
      (i) heat the particulate wood material to a temperature and a pressure in a presence of steam and for a period of time sufficient to soften lignin present in the particulate wood material, and
      (ii) thereafter reduce the pressure, thereby causing defibration of the particulate material and yielding treated particulate wood material, and
   c. pelletizing equipment to thereafter pelletize the treated particulate wood material, wherein
   the comminution station is configured to comminute the elongate pieces of wood material in a single-step operation via a cutting drum provided with cutting teeth, and
   the cutting teeth are sized and the cutting drum is rotated at a rotational speed to cut the elongate pieces of wood to a predetermined particle size, and
   the cutting drum comprises a stack of individual saw blades that allow for separate replacement of each individual blade.

2. The apparatus as claimed in claim 1, wherein the cutting teeth have a largest linear dimension corresponding to a largest desired linear dimension of the particulate wood material.

3. The apparatus as claimed in claim 1, wherein the elongate pieces of wood material include a timber log having a cross-sectional dimension and the comminution station comprises one cutting drum with a cross-section at least twice the cross-sectional dimension of the timber log.

4. The apparatus as claimed in claim 1, wherein the comminution station comprises an additional cutting drum.

5. The apparatus as claimed in claim 1, further comprising a fractionating section that comprises a vertical chute for conveying the particulate wood material from the comminution station to the heat treatment plant.

6. The apparatus as claimed in claim 1, wherein the comminution station is configured to reduce pressure.

7. The apparatus of claim 1, wherein the process plant includes a reactor that heats to a temperature within a range from 180° C. to 250° C. for heating the particulate wood material.

8. The apparatus of claim 7, wherein the particulate wood material comprises a fine particle fraction and a coarse particle fraction that remains heated in the reactor for a duration within a range of 1-15 minutes.

9. The apparatus of claim 1, wherein the particulate wood material comprises a fine particle fraction and a coarse particle fraction and wherein the process plant uses a reactor that heats the one or both of the fine particle fraction and the coarse particle fraction under pressure and is configured to release pressure, causing expulsion of at least a portion of the treated particulate wood material from the reactor into a pressure release vessel.

10. The apparatus of claim 1, further comprising a fractionating section which receives the particulate wood material via assistance of gravity.

11. An apparatus for production of cellulose based fuel pellets from wood logs, comprising:
   a. a comminution station configured to comminute the wood logs into particulate wood material,
   b. a fractionating section located at a position below the comminution station and configured for fractionating the particulate wood material into a fine particle fraction and a coarse particle fraction,
   c. a chute configured to convey the particulate wood material, assisted by gravity, to the fractionating section,
   d. a process plant configured to
      (i) heat one or both of the fine particle fraction and the coarse particle fraction to a temperature and a pressure in a presence of water vapor and air and for a period of time sufficient to soften lignin present in the particulate wood material, and
      (ii) thereafter reduce the pressure, thereby causing defibration of the particulate material and yielding treated particulate wood material, and
   e. pelletizing equipment to thereafter pelletize the treated particulate wood material, wherein
   the comminution station is configured to comminute the wood logs in a single-step operation via a cutting drum provided with cutting teeth, and
   the cutting teeth are sized and the cutting drum is rotated at a rotational speed to cut the wood logs to a predetermined particle size.

12. The apparatus of claim 11, wherein the process plant is configured to heat one or both of the fine particle fraction and the coarse particle fraction to a temperature and for a period of time sufficient to soften lignin present in the particulate wood material.

13. An apparatus for production of cellulose based fuel pellets from elongate pieces of wood material, comprising:
   a. a comminution station configured to comminute elongate pieces of wood into smaller particulate wood material,
   b. a fractionating section for fractionating the particulate wood material into a fine particle fraction and a coarse particle fraction,
   c. a process plant configured to
      (i) heat one or both of the fine particle fraction and the coarse particle fraction to a temperature and a pressure in a reactor containing water vapor or steam and for a period of time sufficient to soften lignin present in the particulate wood material, and
      (ii) thereafter reduce the pressure in the reactor, thereby causing defibration of the particulate material and yielding treated particulate wood material, and
   d. pelletizing equipment to thereafter pelletize the treated particulate wood material, wherein
   the comminution station is configured to comminute the elongate pieces of wood material in a single-step operation via a cutting drum provided with cutting teeth, and
   the cutting teeth are sized and the cutting drum is rotated at a rotational speed to cut the elongate pieces of wood to a predetermined particle size, and
   the cutting drum comprises a stack of individual saw blades that allow for separate replacement of each individual blade.

* * * * *